(12) United States Patent
Keller et al.

(10) Patent No.: US 10,755,837 B1
(45) Date of Patent: Aug. 25, 2020

(54) CABLE WITH FIBER OPTIC SENSOR ELEMENTS

(71) Applicant: NEXANS, Courbevoie (FR)

(72) Inventors: David Keller, Cary, NC (US); Donald Stevens, Lancaster, PA (US); Pritesh Majmundar, New Holland, PA (US); Norman Andrew Punch, Jr., Holly Springs, NC (US); Rakesh Sambaraju, Downingtown, PA (US); Dan Rouse, Apex, NC (US); Randie Yoder, Garner, NC (US)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/381,454

(22) Filed: Apr. 11, 2019

(51) Int. Cl.
| H01B 7/32 | (2006.01) |
| H01B 7/18 | (2006.01) |
| G01D 5/353 | (2006.01) |
| H01B 11/18 | (2006.01) |
| H01B 7/02 | (2006.01) |
| H01B 1/02 | (2006.01) |

(52) U.S. Cl.
CPC ............. *H01B 7/328* (2013.01); *G01D 5/353* (2013.01); *H01B 1/02* (2013.01); *H01B 7/02* (2013.01); *H01B 7/18* (2013.01); *H01B 11/1895* (2013.01)

(58) Field of Classification Search
CPC . H01B 7/18; H01B 7/328; H01B 7/32; H01B 11/002; H01B 11/005; H01B 11/02
See application file for complete search history.

(56) References Cited

U.S. PATENT DOCUMENTS

| 2004/0071382 | A1 | 4/2004 | Rich et al. | |
|---|---|---|---|---|
| 2005/0184738 | A1 | 8/2005 | Weaver | |
| 2010/0277329 | A1 | 11/2010 | Worzyk | |
| 2011/0281050 | A1* | 11/2011 | Jiang | C08L 27/16 428/36.6 |
| 2013/0011106 | A1* | 1/2013 | Congdon, II | G02B 6/44 385/101 |
| 2019/0056278 | A1* | 2/2019 | Risch | G02B 6/245 |

FOREIGN PATENT DOCUMENTS

| CA | 2948706 | 12/2010 |
|---|---|---|
| EP | 2436015 | 4/2012 |
| EP | 2478527 | 7/2012 |
| EP | 2494325 | 9/2012 |
| WO | 2014180664 | 11/2014 |

* cited by examiner

*Primary Examiner* — Timothy J Thompson
*Assistant Examiner* — Amol H Patel
(74) *Attorney, Agent, or Firm* — Sofer & Haroun, LLP

(57) ABSTRACT

A cable is provided for detecting tampering thereof. The cable has at least one copper signal cable, a binder, an inner jacket, an armor, and at least one optical fiber sensor element, disposed within the cable. The at least one optical fiber sensor element is configured attenuate under stress to the cable, sufficient to detect a breach or tapping of the copper signal cable therein.

8 Claims, 11 Drawing Sheets

CABLE WITH FIBER OPTIC SENSOR ELEMENTS

FIELD OF THE INVENTION

This application relates to a communications cable. More particularly, this application relates to a communication cable with fiber optic sensor elements.

BACKGROUND

Description of the Prior Art

In the area of network cabling, particularly copper network cables (LAN—Local Area Network cables), there are many issues surround breach of cable security. With fiber optic cables, breach of cable security is detectable by monitoring equipment that can detect decibel loss, mode changes, and the like, indicative of for example unexpected signal loss/change owing to unauthorized splicing.

However, with copper LAN cables it is more difficult to detect an unauthorized signal access because copper signal cables, such as twisted pair LAN cables, do not necessarily demonstrate pronounced signal changes when a cable is moved or otherwise exposed to discrete signal detecting activity or spliced in an unexpected manner.

OBJECTS AND SUMMARY

It is a shortcoming of the prior art to provide a copper twisted pair LAN cable that includes sensor elements capable of detecting unwanted signal detecting activity or stealing of the signals passing through.

The present arrangement solves this issue by providing a hybrid communications cable having both twisted pair LAN cables as the primary communication components, while also having one or more fiber sensor elements used for detection of unauthorized access or signal detecting activity of the cable.

Moreover, because the cable design is for a secure cable, the cable includes many of the ordinary security features such as a metal armor. In order to increase the effectiveness of the fiber elements in their role as tampering detection elements, the fiber sensor elements which would ordinarily (if in a signal carrying role) be protected from outside forces, are instead placed in more vulnerable, less protected locations within the cable structure so that they are more sensitive to movements and/or disruptions caused by attempted violations of the cable integrity.

To this end, a cable is provided for detecting tampering thereof. The cable has at least one copper signal cable, a binder, an inner jacket, an armor, and at least one optical fiber sensor element, disposed within the cable. The at least one optical fiber sensor element is configured attenuate under stress to the cable, sufficient to detect a breach or signal detecting activity of the copper signal cable therein.

BRIEF DESCRIPTION OF THE DRAWINGS

The present invention can be best understood through the following description and accompanying drawing, wherein.

DETAILED DESCRIPTION

Figure 1:
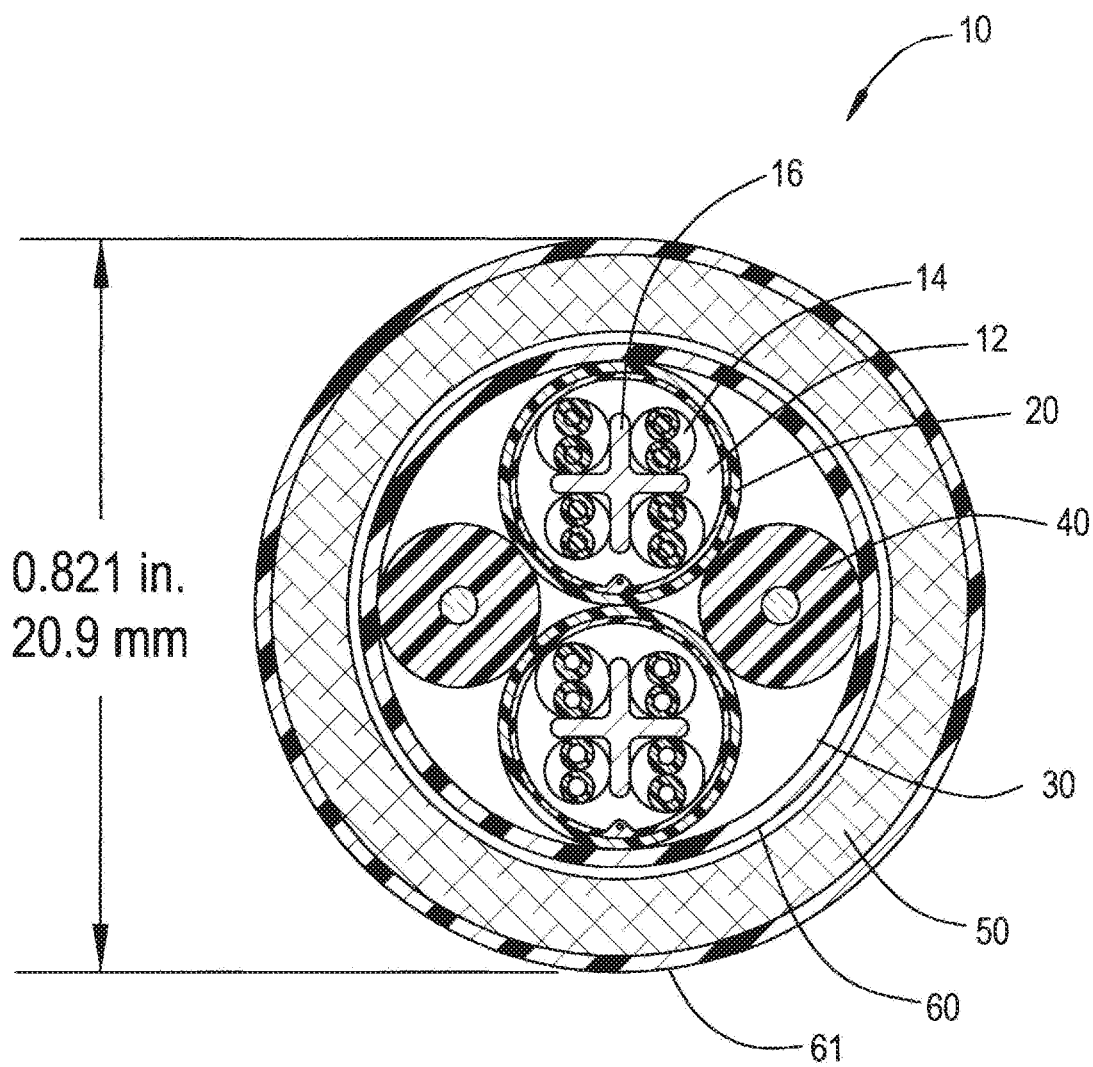
FIG. 1 shows a general structure of an armored twisted pair LAN cable.

As shown in FIG. 1, an exemplary data communication cable 10 is shown having two twisted pair cables 12, each of which have four twisted pairs 14, a cross filler 16, a rip cord 18, and a jacket 20. The remainder of cable 10 is fitted a binder yarn 30, two filler/spacer units 40, interlock armor, wire braid, and/or dielectric armoring 50, and both internal and external jackets 60 (internal) and 61 (external).

In some arrangements, binder yarn 30 is standard binder armor is a typical binding filament to contain the core elements of cable 10 in place during jacketing and armoring. In some arrangements, internal jacket 60 and external jacket 61 are plenum rated polymer jacketing commonly used in armored cable arrangements for LAN cables.

In some arrangements, filler spacer units 40 are polymer spacer elements for maintaining special geometry of the cable core elements underneath of binder 30. Interlock armor 50 is typically interlocked aluminum armor included for its tamper resistant features. However, armor 50 may be in the form of a braided metal armor or even a dielectric polymer armoring (i.e. durable tamper resistant polymer—separate from jackets 60/61).

As shown in FIG. 1, in each of the above embodiments cable 10 forms the basis of one exemplary base cable embodiment of cable 10 that will further be outfitted with fiber optic sensor elements, discussed below with respect to FIGS. 2-11. However, the below discussed sensor embodiments may be employed in other basic cable designs for copper and/or fiber optic cables as desired.

Figure 2:
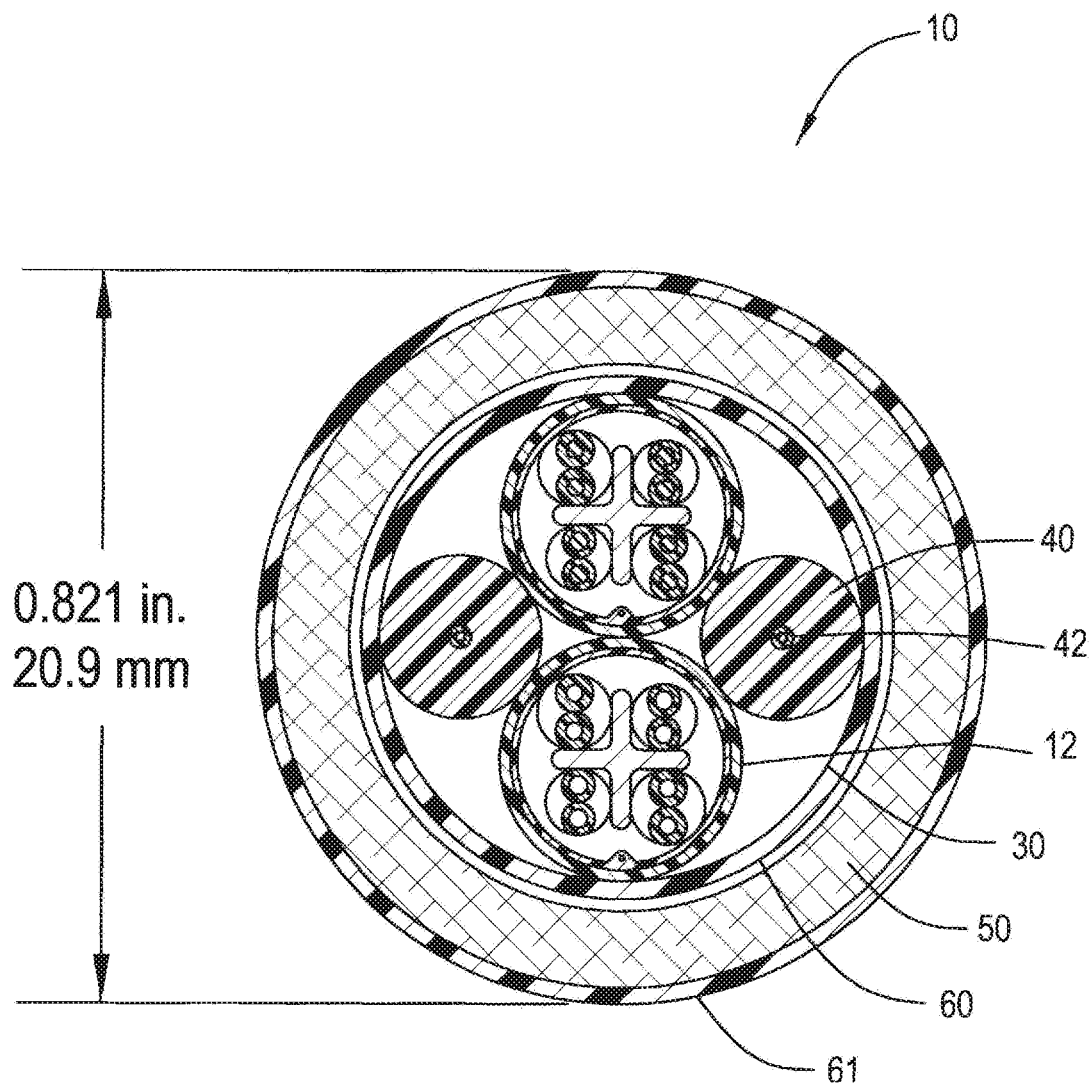
FIG. 2 shows an armored twisted pair LAN cable with fiber sensor elements in accordance with one embodiment.

In first embodiment, as shown in FIG. 2, spacer units 40 are each fitted with a fiber unit 42. In this arrangement, fiber units 42 disposed within spacer elements 40 are in direct contact with the inside of binder 30 and/or inner jacket 60. This arrangement represents a fiber element 42 that exhibits a first, somewhat sensitive, level to external pressures. Ordinarily, a fiber unit for normal fiber optic signal purposes would not be, by virtue of its jacket 40, in direct contact with the outer barrier of the cable, such as inner jacket 60 in this case. Owing to this contact, movement of the cable will directly translate into movement of fibers 42 resulting in some perceptible change in a monitoring signal passing therethrough (e.g. in the form of some signal strength disruption). This embodiment in FIG. 2 still shows Fibers 42 in a somewhat protected environment but still less protected than an ordinary signal fiber. The following embodiments in FIGS. 3-10 each show progressively less protection for their respective fiber sensor elements, and thus are progressively more sensitive to outside vibrations.

Figure 3:
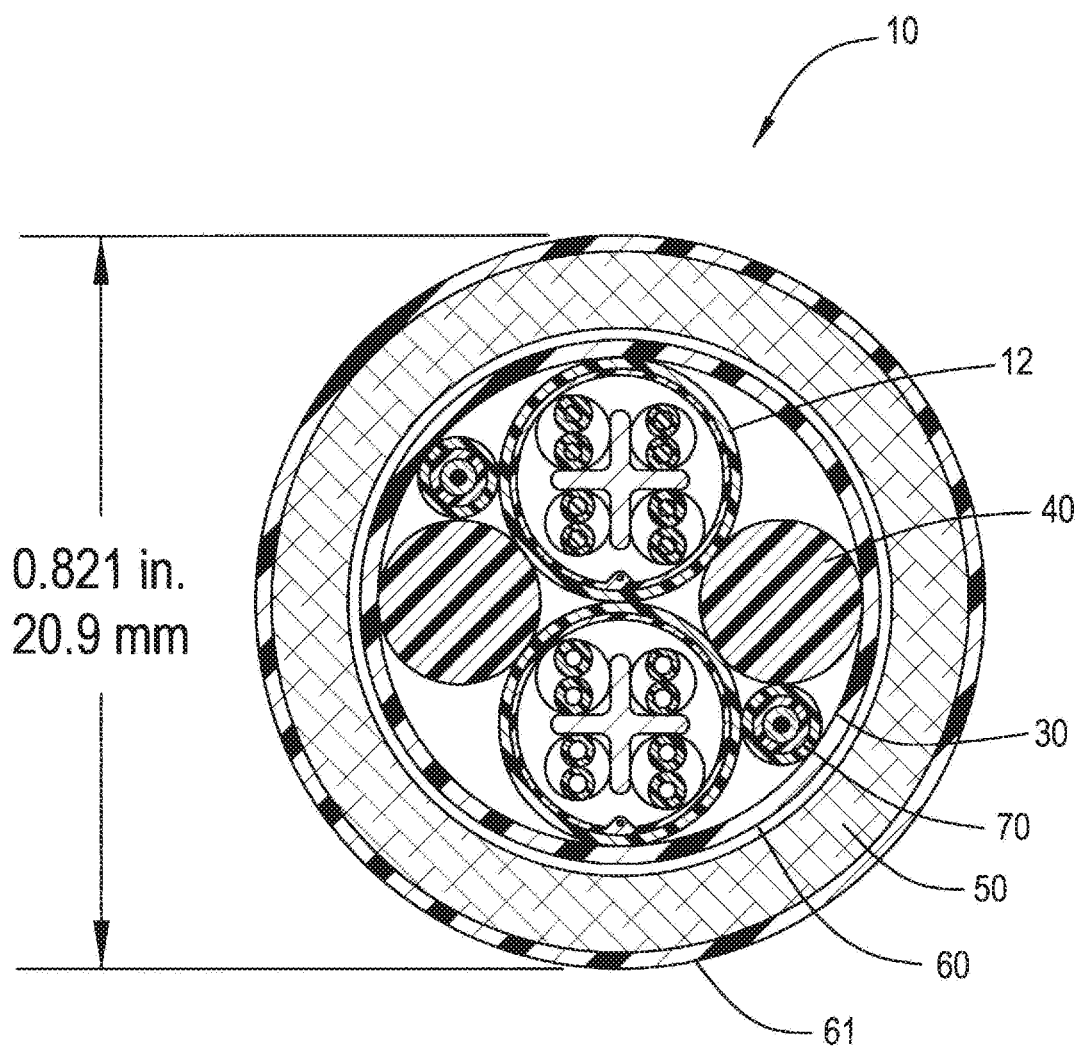
FIG. 3 shows an armored twisted pair LAN cable with fiber sensor elements in accordance with another embodiment.

In a second embodiment, as shown in FIG. 3, two fiber sensor elements 70 are included between spacers 40 and twisted pair cables 12, pressed up against binder yarn 30/inner jacket 60. The structure of fiber sensor element 70 is in the form of a standard or tight buffer fiber within a tube/aramid jacket. Element 70 is placed abutting against yarn 30 and/or inner jacket 60. The structure of element 70 provides a little protection for the fiber but it is likewise exposed to certain tampering forcers such as vibrations and sounds initiated against armor 50 and outer jacket 61, similar to the arrangement of FIG. 2.

It is noted that the embodiments described in FIGS. 2 and 3 are described separately, but it is contemplated that each of the various fiber elements described in this application may be used a combination thereof, suitable for providing the necessary detection signal sensitivity desired for the particular cable application. This may involve the use of one or more types of fiber sensors such as those described in FIGS. 2-10 or even all of the possible sensor arrangements combined as shown in FIG. 11.

Figure 4:
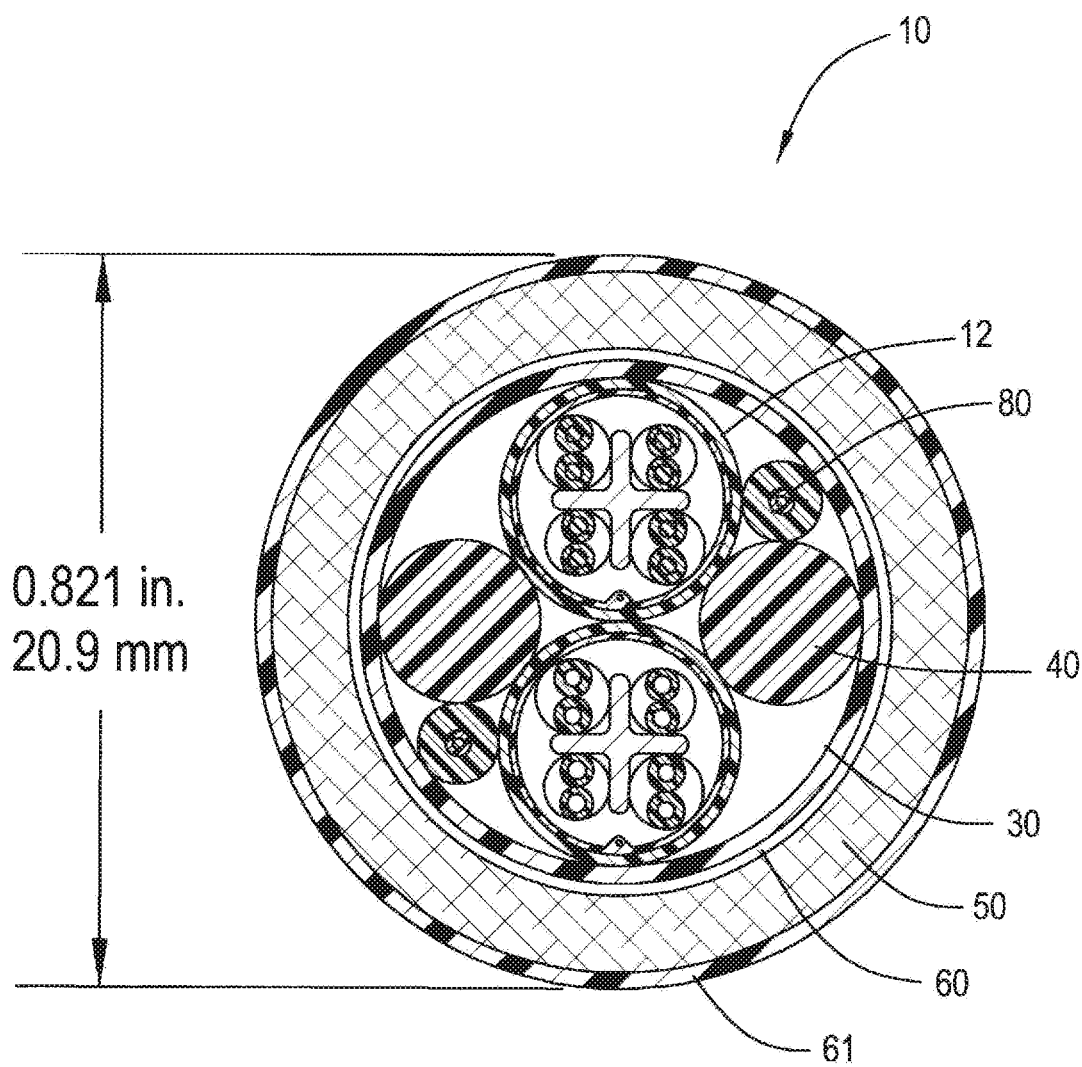
FIG. 4 shows an armored twisted pair LAN cable with fiber sensor elements in accordance with another embodiment.

In a third embodiment, as shown in FIG. 4, two fiber sensor elements 80 are added between spacers 40 and twisted pair cables 12, pressed up against binder yarn/inner jacket 30. In this arrangement fiber sensor element 80 is similarly situated within cable 10 as fiber element 70 of FIG. 3, but in this case sensor element 80 provides its fiber with less protection than 70, since it is jacketed with a solid enlarged jacket that affords solid transfer of the forces and sounds that might be directed against inner jacket 60 and armor 50 during an attempted unauthorized mid-span access.

Figure 5:
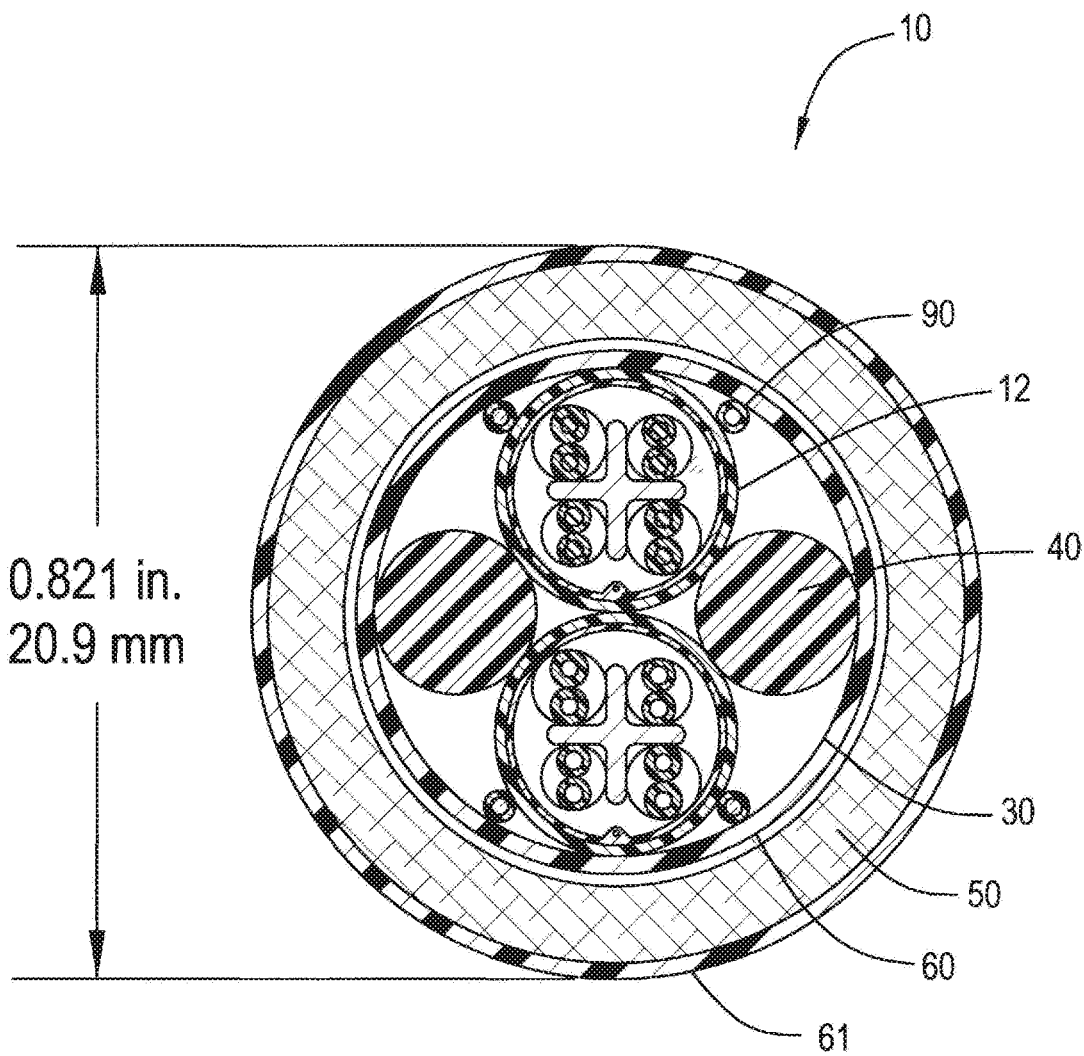
FIG. 5 shows an armored twisted pair LAN cable with fiber sensor elements in accordance with another embodiment.

In a fourth embodiment, as shown in FIG. 5, one-four fiber sensor elements 90 are added between the small intersection between twisted pair cables 12 and binder yarn 30/inner jacket 60. In this arrangement sensor fibers 90 are 900 micron coated fiber elements (such as filled PVC coating). Such an arrangement with only 900 micron protection and located close to the inner jacket 60/armor 50 would be more sensitive to outside forces/movements etc. . . . than the prior embodiments as they are only protected by their basic buffer coating.

In one embodiment such fiber elements 90 may be further subject to external forces by being included within binder 30 in a linear arrangement over the other core components (LAN cables 12, bumpers 40 etc.) which are otherwise stranded as in most communication cables. In this version, sensor elements 90 would run linear over underlying twisted components causing many cross-over points (over the twisting underlying components) that would increase sensitivity.

Figure 6:
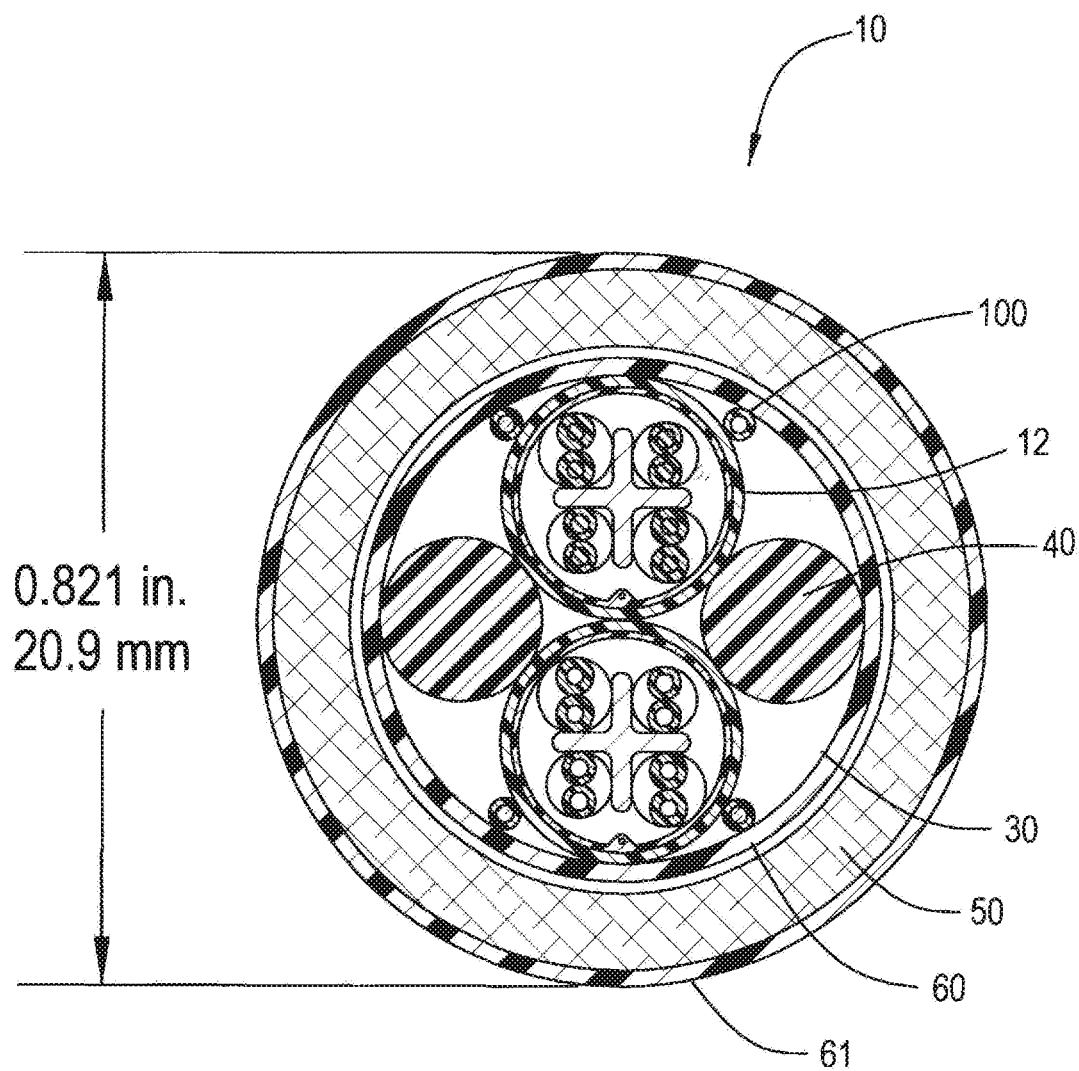
FIG. 6 shows an armored twisted pair LAN cable with fiber sensor elements in accordance with another embodiment.

In a fifth embodiment, as shown in FIG. 6, four fiber sensor elements 100 are added between the small intersection between twisted pair cables 12 and binder yarn 30/inner jacket 60. This embodiment is very similar to that in FIG. 5 except that fiber sensor elements 100 are 900 micron tight buffer fibers as opposed to filled PVC coated fibers of similar size. It may be noted the sensor elements 90 of FIG. 5 may transfer and signal more vibrations or interruption signals as the filled PVC coating of signal elements 90 would be slightly less resilient/vibration absorbent, than the tight buffer UV coating of fiber sensor elements 100.

Figure 7:
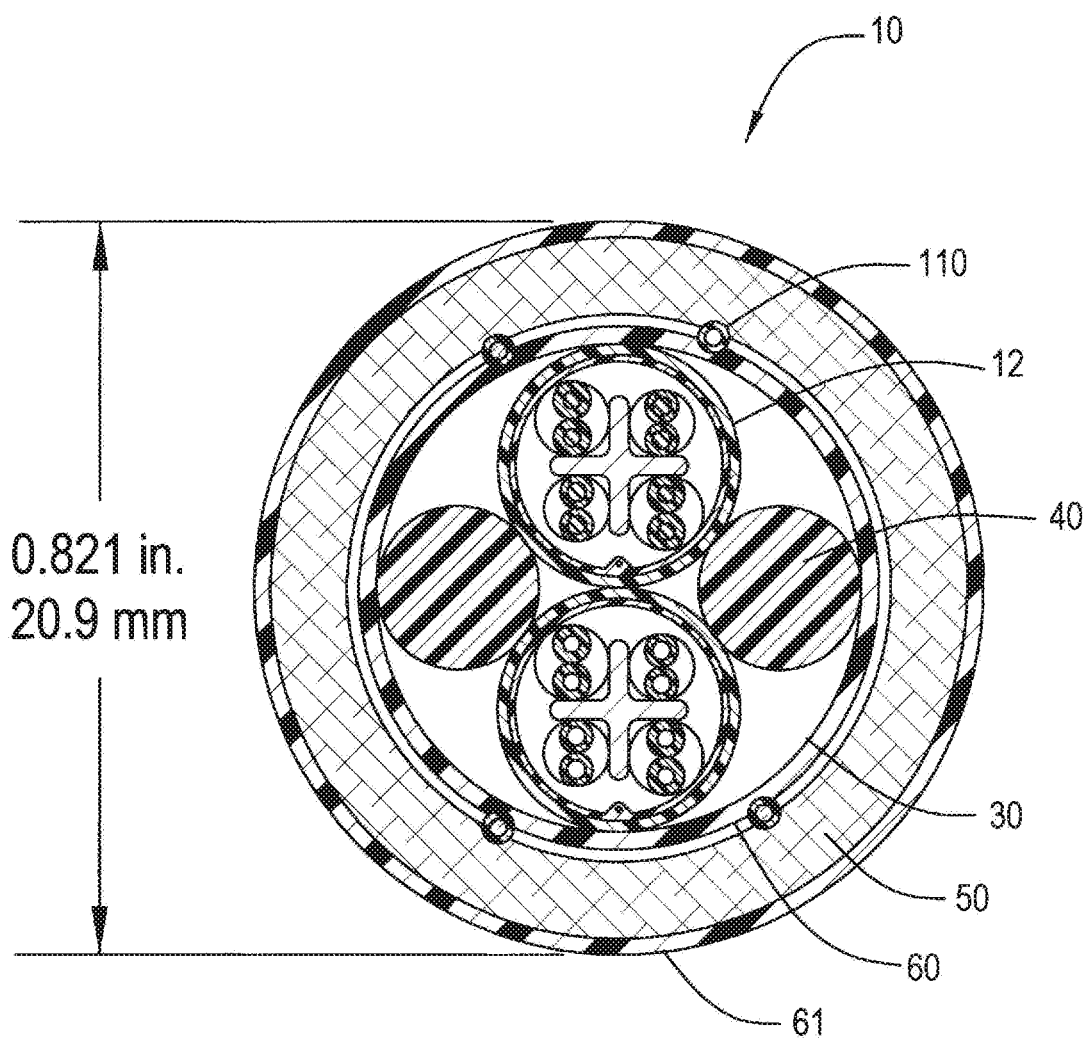
FIG. 7 shows an armored twisted pair LAN cable with fiber sensor elements in accordance with another embodiment.

In a sixth embodiment, as shown in FIG. 7, four fiber sensor elements 110 are added between inner jacket 60 and the inside of armor 50. Such sensor elements 110 may be constructed as 900 micron filled PVC fiber elements similar to sensor elements 90. However, in this embodiment sensor elements 110 are directly touching armor 50 and would be very sensitive to movements and be essentially unprotected. Even very small movements of cable 10 would significantly impact any sensor signals being passed therethrough, for example with significant losses in signal strength (in dB).

Figure 8:
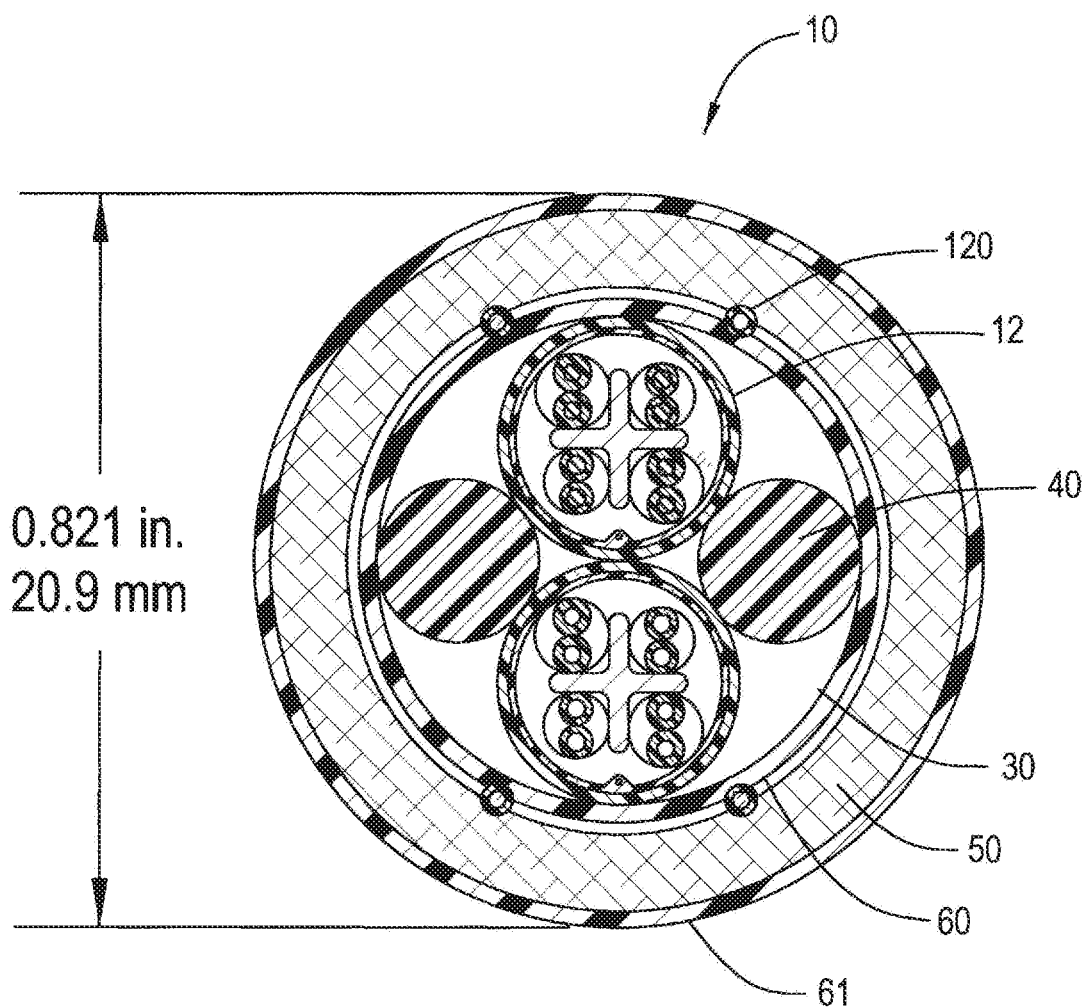
FIG. 8 shows an armored twisted pair LAN cable with fiber sensor elements in accordance with another embodiment.

In a seventh embodiment, as shown in FIG. 8, four fiber sensor elements 120 are added between inner jacket 60 and the inside of interlock armor 50. Such an arrangement is similar to FIG. 7 except that fiber sensor elements 120 are tight buffer coated fibers (instead of being filled PVC coated fibers of the same size) resulting in slightly less sensitivity than fiber sensor elements 110.

Figure 9:
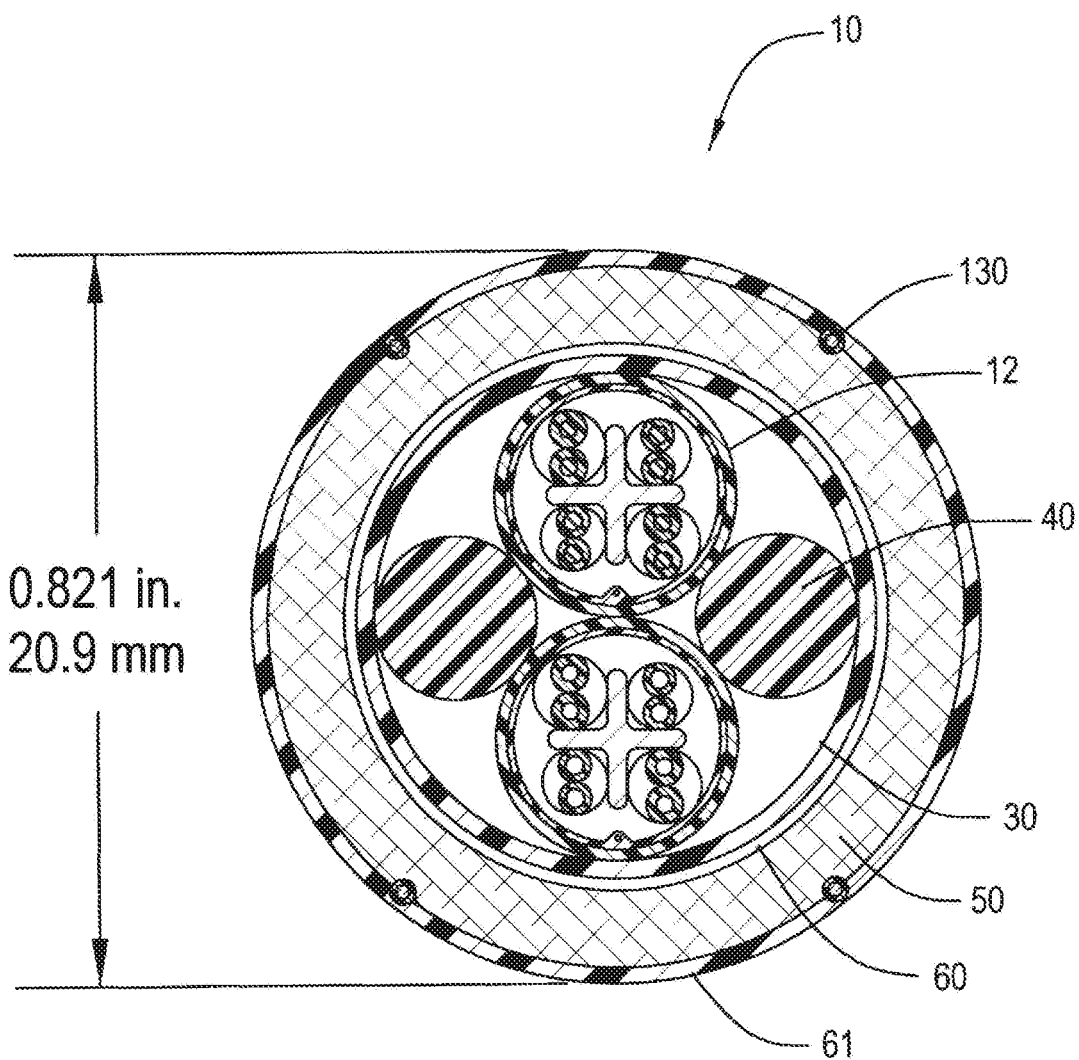
FIG. 9 shows an armored twisted pair LAN cable with fiber sensor elements in accordance with another embodiment.
Figure 10:
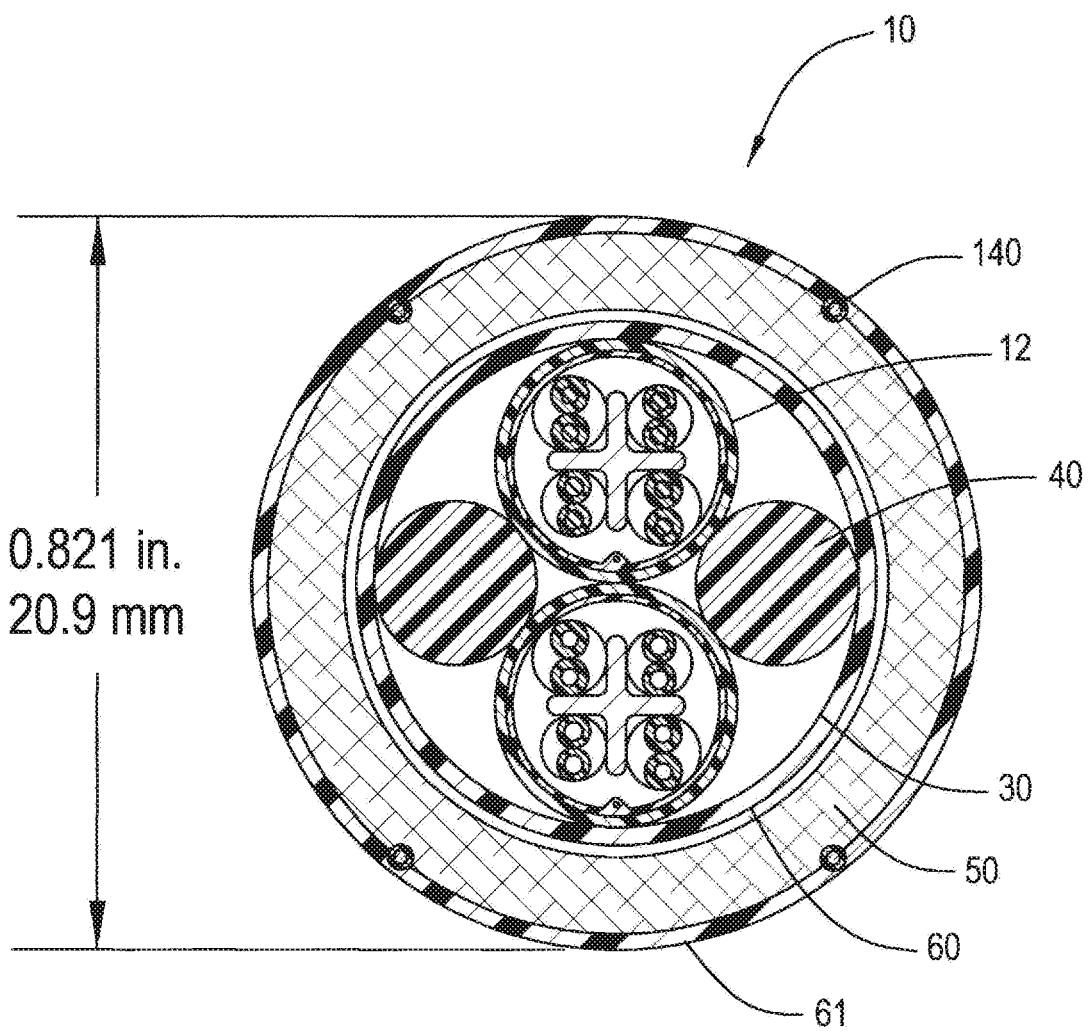
FIG. 10 shows an armored twisted pair LAN cable with fiber sensor elements in accordance with another embodiment.
Figure 11:
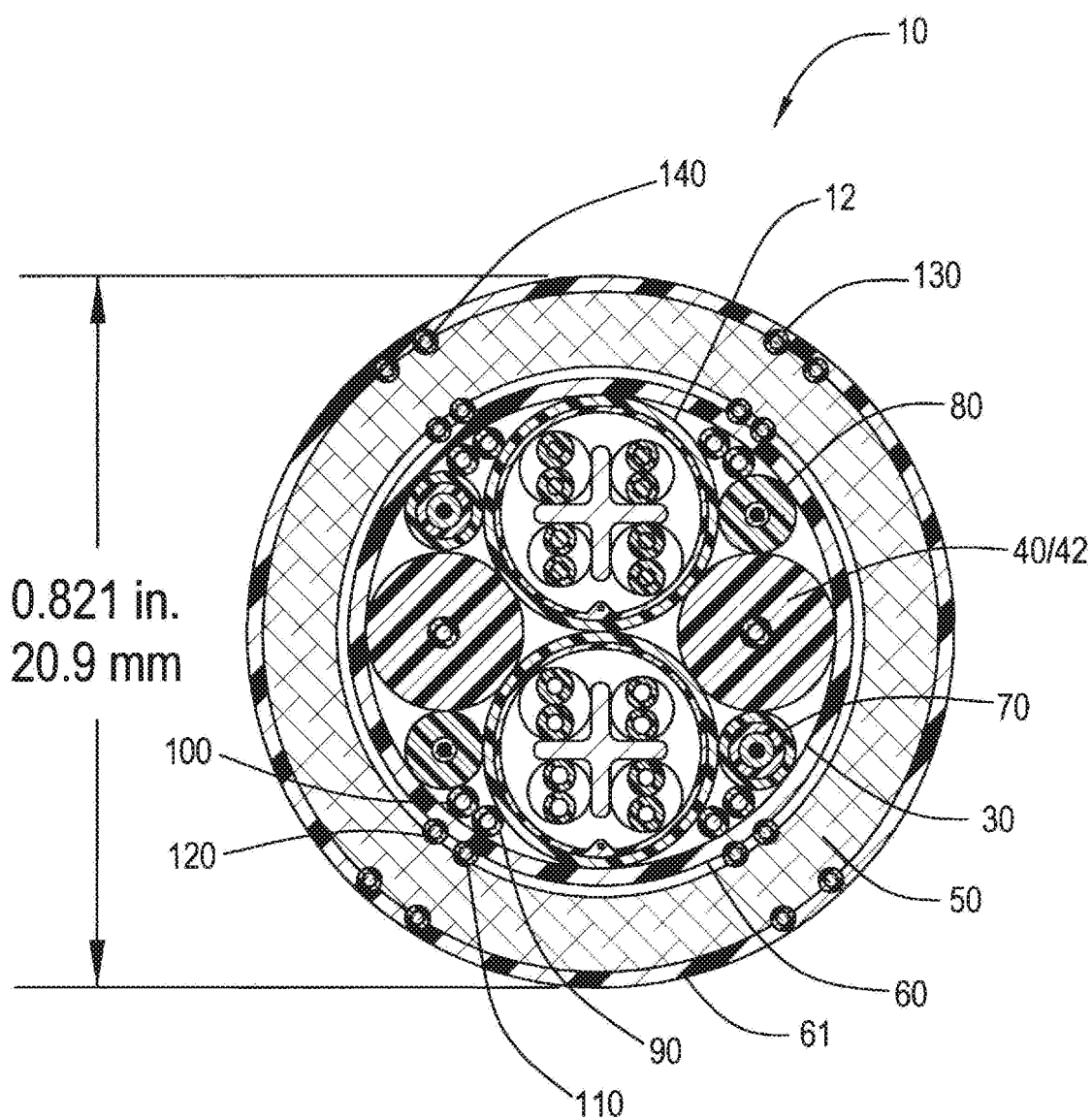
FIG. 11 shows an armored twisted pair LAN cable with combined fiber sensor elements in accordance with another embodiment.

The eighth and ninth embodiments shown in FIGS. 9 and 10 have sensor elements 130 or sensor elements 140 directly on top of armor 50 under outer jacket 61. This placement of sensor elements 130 or 140 essentially outside of cable 10 and provides extremely sensitive fiber elements that would detect essentially any outside environmental incident. Sensor elements 130 would be filled PVC coated fibers and sensor elements 140 would be tight buffer fibers, similar to the prior embodiments to provide slight variation in sensitivity options within these two embodiments.

In a tenth embodiment, as shown in FIG. 11, all of fiber sensor units 40/42, 70, 80, 90, 100, 110, 120, 130, and 140 are shown in a single cable 10. It is understood that any permutation of this design with more or less sensor units may be included.

In operation, the fiber sensor elements described above are connected to a detection unit. Cable 10 may be used in any desired detection methodology that employs changes in signal quality in the fiber optic sensor elements to detect for example, movements or breeches of the cable. Owing to the sensitive non-protected locations of the fiber sensor elements with respect to armor 50 of cable 10, even slight movements of cable 10 will disrupt optical signals in the sensor elements. As such, it would be difficult to splice or engage in signal detecting activity on the signals in copper LAN cables 12 without detectable variations in the light signals passing through fiber sensor elements.

For example, a detection unit could be used to send a baseline optical signal for each of the fiber sensor elements of cable 12 (be it one or more). In some cases, if different embodiments of sensor elements are used (e.g. a sensor element 70, sensor element 90 and sensor element 110, used in the same cable 10), they may each have their own baseline signal taken, such as after initial installation.

Thereafter movements of cable 10, causing variations in the optical signal would be detected, including loss of signal strength (in dB), mode changes or variations etc. . . . . . Some testing or AI (Artificial Intelligence) can be used to develop a profile of certain movements/agitations that create certain corresponding changes to develop a breech detection alert signal change profile. Cable 10 can later be monitored with the baseline signal and in the case of an alert style signal change caused by movement of the fiber sensors then an alert may be generated and distributed to the required personnel.

In some embodiments the fiber sensors elements that are least insulated, such as sensor elements 130 and 140, are signal overloaded in order to provide excess bandwidth to handle the increased level of signal activity that would be needed to use such sensor elements for detection sensors (as they would experience very significant attenuation during movements or attempted accesses.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A cable for detecting tampering thereof, said cable comprising:
    at least one copper signal cable,
    a binder,
    an inner jacket;
    an armor; and
    a plurality of optical fiber sensor elements, each disposed within said cable between said inner jacket and said armor, in a configuration that subjects said optical fiber sensor to external conditions, wherein said at least one optical fiber sensor element is configured to attenuate under changes in said external conditions against said armor.

2. The cable as claimed in claim 1, wherein said copper signal cable is a four twisted pair LAN cable.

3. The cable as claimed in claim 2, wherein said cable has two four twisted pair LAN cables.

4. The cable as claimed in claim 1, wherein said inner jacket is a plenum rated polymer jacket.

5. The cable as claimed in claim 1, wherein said optical fiber sensor elements are filled PVC coated optical fibers.

6. The cable as claimed in claim 1, wherein said optical fiber sensor elements are tight buffer coated optical fiber.

7. The cable as claimed in claim 1, wherein said plurality of optical fiber sensors are each at different locations within said cable, in proximity to said armor.

8. The cable as claimed in claim 1, wherein said optical fiber sensor elements are disposed within said cable, and configured attenuate under changes to said external conditions, sufficient to detect a breach or unauthorized signal detecting activity of said copper signal cable therein.

* * * * *